United States Patent Office 3,269,652
Patented August 30, 1966

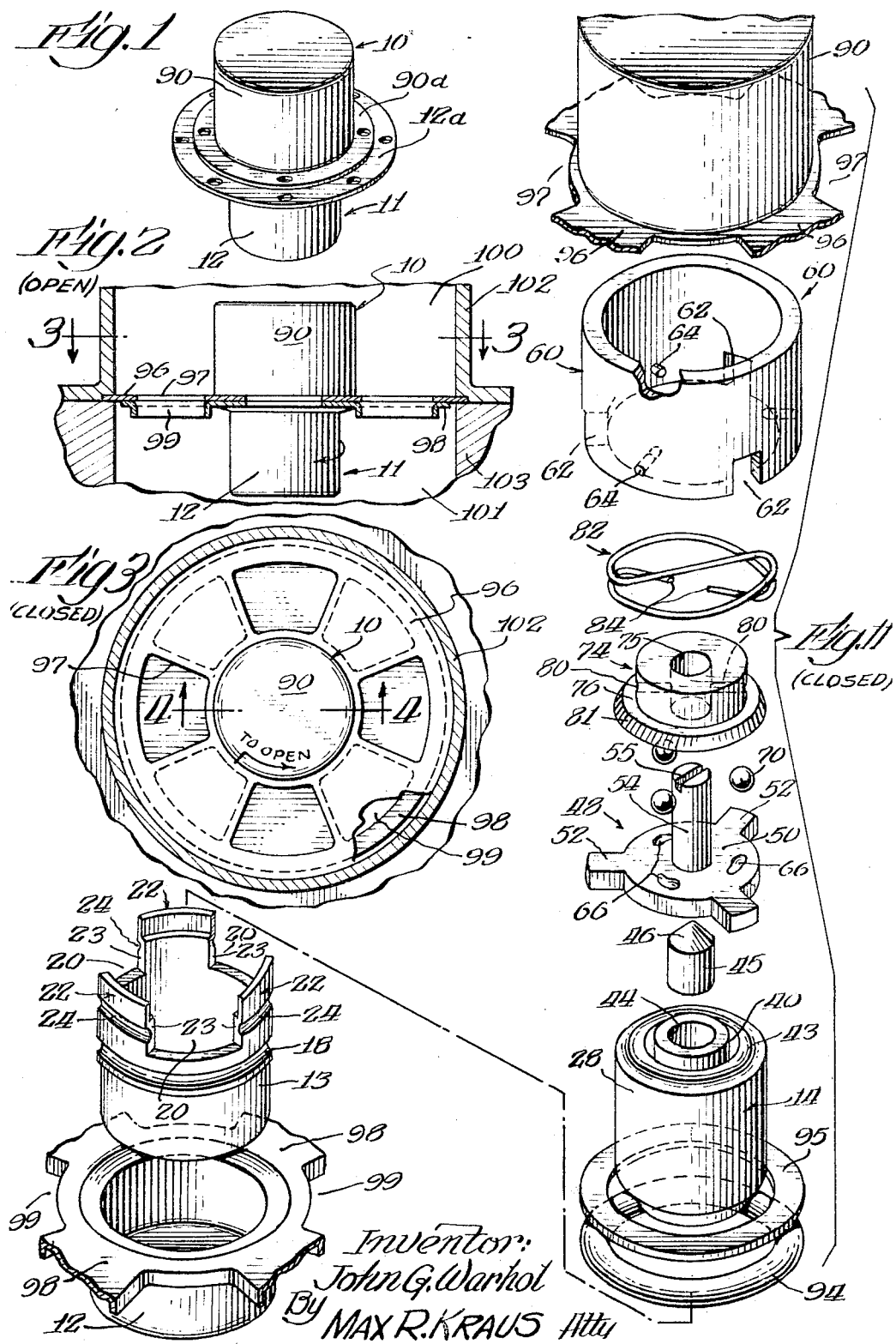

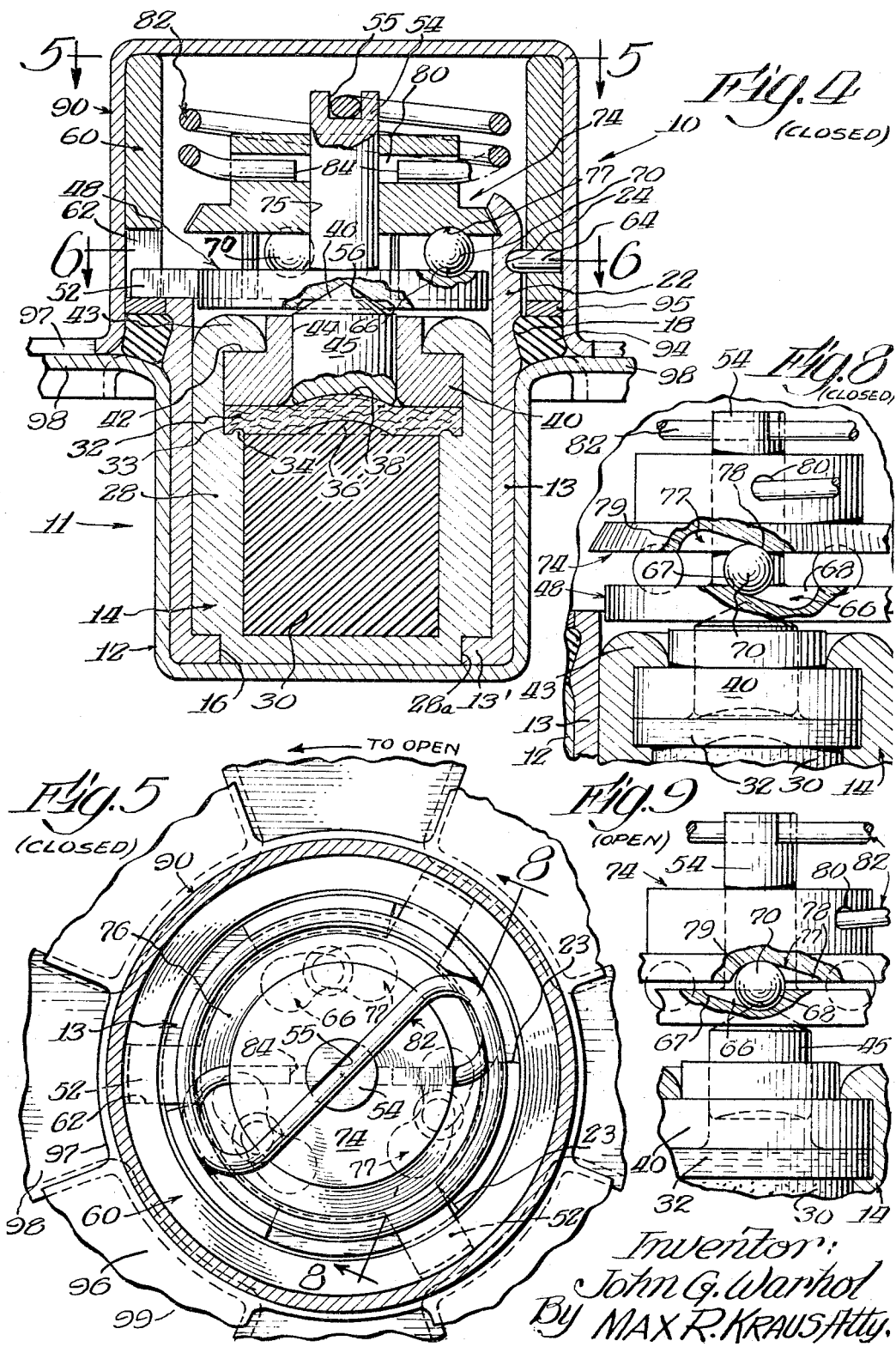

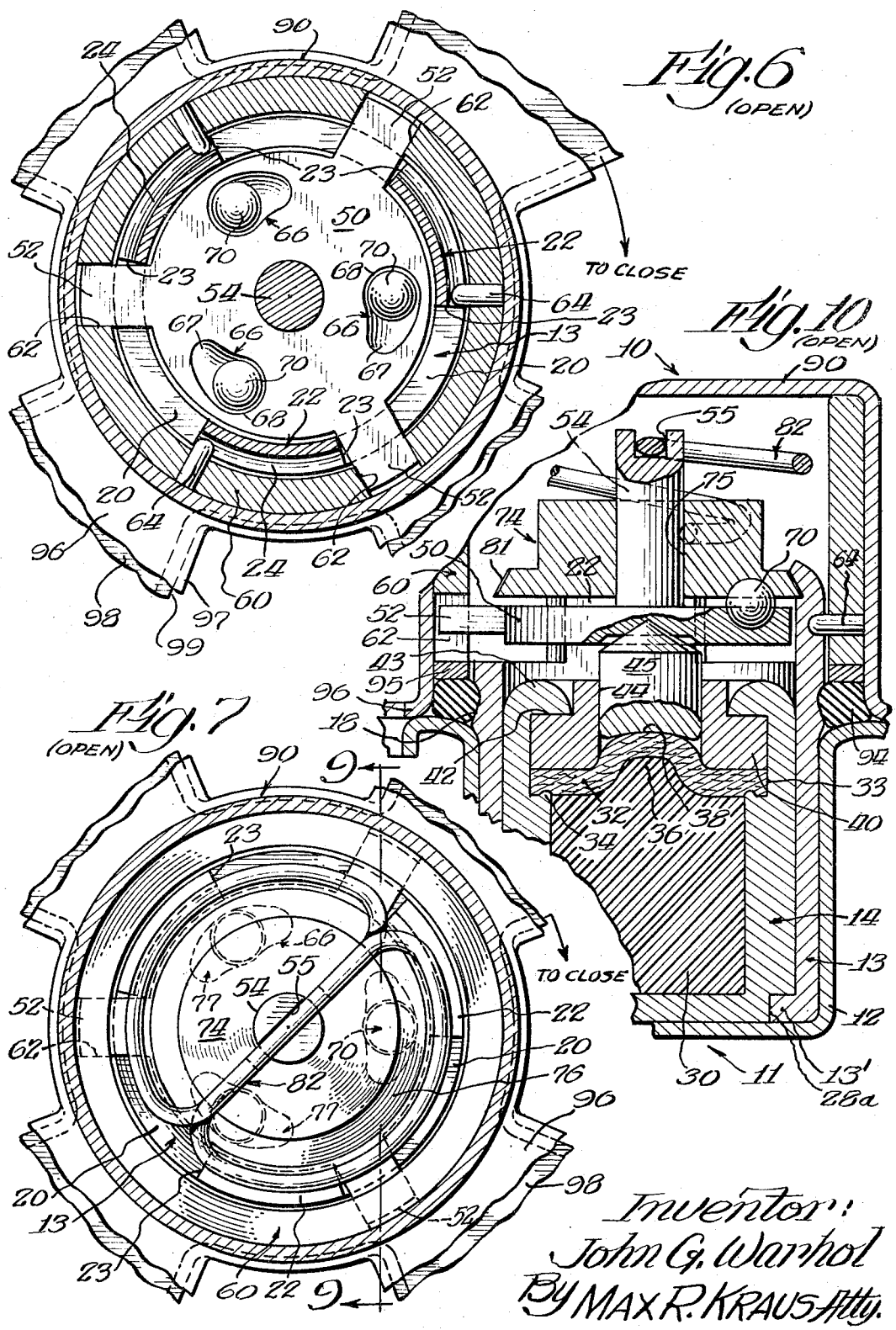

3,269,652
THERMALLY OPERATED MEANS FOR OPERATING VALVES AND OTHER OBJECTS
John G. Warhol, Oak Park, Mich., assignor to Nelmor Corporation, a corporation of Illinois
Filed Aug. 4, 1964, Ser. No. 387,309
9 Claims. (Cl. 236—34)

This invention relates to thermally operated means for operating valves and other objects.

One of the objects of this invention is to provide a unit employing a thermally expansible material which when heated will expand and produce the rotation of a rotatable member to move same in relation to a stationary member. The invention embraced herein may thus be used in connection with, but not limited to, valve structures employed in controlling the temperature of internal combustion engine coolants, in that as the temperature increases the expansible material will cause the valve member to operate to open and permit passage of the coolant material through the radiator. It will be understood, however, that while the invention has particular application for use in connection with a system wherein a valve construction is utilized having stationary and rotatable plates with openings therein which are alined and disalined due to the thermal expansion and contraction of the material, that the invention is not limited to such use, as this invention may be employed for other uses wherein the parts may be operated by the rotation or movement of one relative to the other.

Another object of this invention is to provide a unit which has a motor source employing a thermally expansible material and wherein the thermally expansible material is completely enclosed and sealed, thereby eliminating the possibility of water, liquid or foreign substance contacting the material and corroding or otherwise impairing the efficiency or life of the expansible material. This invention, therefore, provides a structure which increases the life and efficiency of the expansible material which forms the motor source.

Another object of this invention is to provide a thermally expansible unit which is self-contained and so constructed that it can be readily inserted as a complete unit into the device, which permits ready replacement of the motive source as a unit.

Another object of this invention is to provide a structure of the foregoing character which is relatively small in size, permitting its use for a variety of purposes including, for example, its use in operating an electrical switch, rheostat, or the like. It may also be operatively connected to operate gears, levers, and the like, which are to be actuated and their operation controlled.

Other objects will become apparent as this description progresses.

In the drawings:

FIG. 1 is a perspective view of the exterior of the unit forming this invention and showing an upper mounting flange on which the unit may be mounted and a lower rotatable flange which may be coupled or connected to any structure which is to be operated or rotated.

FIG. 2 is a view showing the unit constructed to operate valve means, for example, as a thermostat in a vehicle water system.

FIG. 3 is a plan view taken on lines 3—3 of FIG. 2, showing the valve means in closed position.

FIG. 4 is an enlarged sectional view taken on lines 4—4 of FIG. 3, showing same in closed position.

FIG. 5 is a view taken on lines 5—5 of FIG. 4, showing same in closed position.

FIG. 6 is a view taken on lines 6—6 of FIG. 4, showing same in open position.

FIG. 7 is a view similar to FIG. 5, but showing same in open position.

FIG. 8 is a view taken on lines 8—8 of FIG. 5, showing same in closed position.

FIG. 9 is a view taken on lines 9—9 of FIG. 7, showing same in open position.

FIG. 10 is a view similar to FIG. 4, showing same in open position, and

FIG. 11 is an exploded perspective view of the parts.

The device comprises generally a stationary element, a motor means supported therein and a rotatable element operated by the motor means. The motor means comprises a material which is expandable and contractible by temperature changes. The stationary element, here shown as the upper member and generally indicated at 10, is adapted to be mounted or supported in a stationary position. The rotatable bottom member, generally indicated at 11, is rotatable with respect to the stationary member 10. The bottom rotatable member 11 includes an outer housing 12, a drive sleeve 13 fixedly supported therein and a motor unit, generally indicated at 14, fixedly supported therein.

The drive sleeve 13 has an annular flange 13' defining a central opening 16. The sleeve 13 is provided with a continuous exterior facing annular groove 18 which accommodates an O-ring, to be described. The drive sleeve 13 is provided with three equally spaced openings or slots 20 which extend to the top of the sleeve. The three openings define three spaced arcuate-shaped segments 22 which are an integral part of the sleeve 13. Each opening or slot has approximately a 68° opening to permit the sleeve 13 to rotate with respect to the fingers of the stationary cam plate, to be described. The segments 22 are each provided with an exteriorly facing groove 24, each of which accommodates a pin or prick punch indentation extending from the stationary member, to be described.

Supported within the rotatable member 11 is the motor unit which contains the expansible wax. The motor unit, generally indicated at 14, includes a cylinder 28 which contains a temperature responsive expansible and contractible material 30, well known in the art. It may comprise an expansible wax such as described in Patent No. 3,092,322, or it may be a thermally expansible material of the character described in Patent No. 2,815,174. No invention is claimed in the character of the thermally expansible material. The expansible material is covered by a rubber diaphragm 32, the outer edge of which rests on the shoulder 33 of the cylinder 28. The shoulder 33 has a bead 34 which engages the diaphragm 32.

The expansible material under normal conditions, that is, when the temperature is cold or cool has a centrally raised outer portion 36 which imparts a corresponding centrally convex portion 38 in the diaphragm. A head, generally indicated at 40, rests on top of the diaphragm 32 and said head has a shoulder 42 engaged by the upper lip 43 of the cylinder 28 to lock the parts in position. The head 40 has a central opening 44 which accommodates a plunger 45 having a cone-shaped upper end 46 extending outwardly of the head 40. The bottom of the plunger 45 is concave to conform to the convex surface 38 of the diaphragm on which it rests and is actuated by the movement of the expansible material 30 and diaphragm 32. The bottom of the cylinder 28 has a recessed bottom 28a so that it may be inserted in the bottom opening 16 of the drive sleeve 13. The motor unit 14 is fixedly mounted in the drive sleeve 13 to rotate with said sleeve. It is insertable as a unit and is completely enclosed and self-contained. It may be removed as a unit for replacement.

Resting on the plunger 45 is a lower cam disc member, generally designated at 48, comprising a bottom plate 50 provided with three equally spaced radially extending fingers 52. Extending upwardly of the plate 50 is a stem 54 having a transversely extending slot 55 at the top thereof. The underside of the plate 50 has a central or axially positioned cone-shaped recess 56. The cone-shaped recess 56 is adapted to accommodate and rest on the cone-shaped surface 46 of the plunger 45. The fingers 52 extend through the slots 20. The fingers 52 of the lower cam disc 48 also extend into slots provided in the stationary guide member, generally indicated at 60, and presently to be described, for the purpose of constraining rotation of lower cam disc 48 but permitting axial movement thereof.

The stationary guide member 60 has a tubular-shaped body provided with three equally spaced slots 62 at the bottom thereof which slidably accommodate the fingers 52 of the lower cam disc member 48. The slots 62 extend vertically a sufficient height to permit axial movement of the lower cam disc 48 relative to the stationary guide member 60. The stationary guide member 60 is provided with inwardly extending pins 64 which engage the annular grooves 24 in the segments 22 of the drive sleeve 13 to prevent upward movement of the drive sleeve 13.

The upper surface of the plate 50 of the lower cam disc 48 is provided with three equally spaced raceways or grooves 66 which gradually deepen from the shallow end 67 to the deep end 68. The raceways enlarge or widen from the shallow to the deep end and each raceway accommodates a ball 70. The shallow end of one raceway follows the deep end of the next adjacent raceway.

A rotatable upper cam member, generally designated at 74, is fixedly secured to the upper end of the drive sleeve 13. Said rotatable upper cam member 74 has an axial bore 75 to accommodate the stem 54 of the lower cam disc 48. The bottom portion 76 of the rotatable upper cam member 74 is of an enlarged diameter and has three equally spaced raceways or grooves 77. The raceways 77 gradually slope from the shallow end 78 to the deep end 79 to accommodate the balls 70. In the lower raceways 66 the shallow end is diametrically opposed to the shallow end of the upper raceways 77 when the unit is in a closed position, as shown in FIGS. 4, 5 and 8, and the deep ends are diametrically opposed when the unit is in an open position, as shown in FIGS. 6, 7, 9 and 10.

The rotatable upper cam member 74 has a diametrically disposed hole 80. The enlarged bottom portion 76 has a knurled conical edge 81. The rotatable cam member 74 is secured to the upper end of drive sleeve 13 by bending the upper end of the segments 22 of the drive sleeve 13 into engagement with the knurled conical edge 81, as best seen in FIG. 4, to prevent relative movement therebetween.

A combination torsion and tension spring, generally indicated at 82 is preloaded to oppose or counteract the rotation of the rotatable member 11 against the rotation of said rotatable member produced by the expansion of the temperature responsive material 30. As shown in the free position in FIG. 11, the spring 82 is convoluted to form a generally figure eight configuration in plan. In assembled position the opposite ends 84 of the spring extend into and are anchored in the hole 80 of the rotatable upper cam disc 74. The center portion of the spring 82 is retained in the slot 55 of the stem 54 of the lower cam disc 48. The spring pushes the lower cam disc 48 in the direction of the plunger 45 and the ends 84 of the spring through engagement with the hole 80 of the upper cam disc 74 urge the drive sleeve 13 in opposition to the energized movement of motor 14. The preloaded spring 82 also returns the drive sleeve 13 by rotating it to the limit of its travel in the direction opposite to that when energized.

As the thermally expansible material 30 expands, the lower cam disc 48, including the stem 54 thereof, moves axially relative to upper cam member 74 causing the balls 70 to move up therewith and rotate and roll on the inclined surfaces of the raceways, causing the upper cam member 74 to rotate approximately 45°. Rotation of member 74 is stopped when edges 23 of segments 22 strike the fingers 52 of the lower cam disc 48. The spring 82 is energized by such movement. On contraction of the expansible material 30 the spring 82 will unwind and thereby return the drive sleeve 13 to its previous position. In returning the drive sleeve 13 the drive sleeve will be rotated until the edges 23 of segments 22 strike the fingers 52.

The stationary member 10 is enclosed within a housing, generally indicated at 90. The housing sections 12 and 90 may be coupled or connected to any structure wherein it is desired that the expansion and contraction of the mass 30 due to changes in temperature operate to cause a rotation of one housing section relative to the other, for the purpose of performing a required function or operation. An O-ring 94 and washer 95 are interposed between the flange 90a of the housing section 90 and the flange 12a of the outer housing 12. The O-ring 94 is received in the annular groove 18 of the drive sleeve 13. In the FIG. 1 embodiment the flange 12a serves as the mounting flange whereby the unit is stationarily secured to a support. The flange 12a of the rotatable housing 12 may be secured to any actuating or control means, such as a gear, lever, electrical switch, rheostat, or anything that is desired to be controlled.

One embodiment of the invention is the use of this device for operating valve means in the cooling system of an internal combustion engine. For example, when the engine is cold it is preferred that the coolant be not circulated through the radiator, and as the temperature in the coolant increases gradually it is preferred that it flow through the radiator and the engine in the system. The present invention is readily adaptable to such a system. In this connection the stationary housing section 90 (FIGS. 2 and 3) is provided with an enlarged annular flange 96 integrally formed therewith and provided with spaced openings 97. The rotary housing section 12 is also provided with an annular flange 98 of a reduced dimension in engagement with the stationary annular flange 96. Annular flange 98 is also provided with spaced openings 99.

The unit is positioned within the chambers 100 and 101 between two parts 102 and 103 which represent portions of an engine coolant system. The stationary flange 96 is clamped between the two parts. The rotary section 12 is free to rotate relative thereto. When the coolant is cold or cool the position of the thermostat will be as shown in FIG. 4, that is, the openings 99 in the rotatable flange 98 will be out of registry with the stationary openings 97, which will therefore close the passage between the chambers 100 and 101 and prevent the passage of the coolant therethrough. As the temperature of the coolant rises it will activate the motor unit 14, causing the material 30 to expand and rotate the drive sleeve 13, as more fully explained hereinafter, so that the flange openings 99 aline with the stationary openings 97 and permit passage of the coolant.

More specifically, the operation is as follows. When the mass 30 is in its non-expansible condition the parts are as shown in FIGS. 3, 4 and 5, with the parts in a closed position, i.e., the valve members or flanges 96 and 98 are positioned to prevent passage of the fluid through the chambers 100 and 101. The rotatable upper cam disc 74 and stationary lower cam disc 48 are positioned at their maximum distance, as best shown in FIGS. 4 and 8, so that the balls 70 are at the shallowest portions of the raceways 66 and 77. When the temperature of the coolant rises and the mass 30 expands, it will cause the raised portion 36 of the mass and the convex surface 38 of the diaphragm 32 to move outwardly axially, thereby sliding the plunger 45 axially outward. As the cone portion 46 of the plunger 45 is in engagement with the lower cam disc 48, the axial movement of the plunger 45 will cause the lower cam disc 48 to move axially towards the upper cam disc 74, with the fingers 52 sliding in the slots 62. As the lower cam disc 48 moves axially towards the upper cam disc 74, it will through the balls 70 cause the upper cam disc 74 to rotate. As upper cam disc 74 rotates, it rotates drive sleeve 13, outer housing 12 and flange 98 to aline the openings 99 with the stationary flange openings 97, this being the open position since the coolant can flow through the alined openings and pass through chambers 101 and 100. The pins or prick punch indentations ride in the grooves 24 of the drive sleeve 13. While the upper cam disc 74 rotates, it rotates relative to lower cam disc 48, and as lower cam disc 48 moves axially outward the spring 82 is distended and tensioned, as previously explained.

When the temperature of the coolant drops, the mass 30 will contract and the spring 82 will unwind and the parts will assume their former position, as shown in FIG. 4, and the spring 82 will push stem 54 with the lower cam plate 48 away from upper cam plate 74, which in turn pushes plunger 45, which in turn pushes diaphragm 32. As this occurs the upper cam member 74 rotates in the reverse direction to its initial position. The upper cam member 74 simultaneously rotates drive sleeve 13 with outer housing 12 and flange 98 to disaline the openings 97 and 99 and close the valve.

It will be understood that various changes and modifications may be made from the foregoing without departing from the spirit and scope of the appended claims.

What is claimed is:
1. A structure of the character described comprising, a stationary member and a rotatable member, a thermally expansible material supported within one of said members, a centrally positioned pin axially movable by said expansible material when expanded, a first member in engagement with said centrally positioned pin and axially movable by said pin, a stem extending outwardly of said first member, a second member cooperating with said first member and rotatable about said stem, rollers positioned between said first and second members so that said second member rotates with the axial movement of the first member, means connecting said rotatable member with said second member so that said rotatable member is rotated with said second member.

2. A structure defined in claim 1 in which spring means are connected to the second member to return the second member to its initial position on contraction of the expansible material.

3. A structure defined in claim 1 in which the expansible material is contained within a container which is removably supported as a unit.

4. A structure defined in claim 1 in which the stationary member is connected to a stationary valve member and the rotatable member is connected to valve means so that rotation of said rotatable member will open said valve means.

5. A structure of the character described comprising, a stationary member and a rotatable member, a motor unit supported in said rotatable member, said motor unit comprising a container and a thermally expansible material supported within said container, a covering for said container having a central opening, a plunger slidably supported in said opening and operable by the expansion and contraction of said expansible material, a slidable member slidable with said plunger, a rotatable driving member rotated by the sliding movement of said slidable member, said slidable member having a plurality of spaced fingers engaging the stationary member to guide the sliding movement of said slidable member, said rotatable member being connected to said rotatable driving member so that said rotatable driving member rotates said rotatable member.

6. A structure defined in claim 5 in which the slidable member has a stem extending through an opening in the rotatable driving member so that the rotatable driving member is supported on said stem, and in which balls are positioned between said slidable member and the driving member.

7. A structure defined in claim 6 in which a spring is connected to the driving member and to the stem to return the driving member to its initial position on contraction of the expansible material.

8. A structure defined in claim 7 in which the stationary and rotatable members are connected to valves which are opened and closed by the movement of the rotatable member with respect to the stationary member.

9. A structure defined in claim 5 in which the structure is mounted within a chamber which is part of an engine coolant system and wherein the stationary and rotatable members are connected to valve means which are opened and closed by the movement of the rotatable member with respect to the stationary member and wherein the closing of the valve means blocks the flow of the coolant through the chamber.

References Cited by the Examiner
UNITED STATES PATENTS

| | | | |
|---|---|---|---|
| 1,833,950 | 12/1931 | Modine | 236—49 |
| 2,177,980 | 10/1939 | Gaul | 236—34.5 |
| 2,894,689 | 7/1959 | Spicer | 236—34.5 |
| 2,960,270 | 11/1960 | Long | 236—34 |
| 3,184,164 | 5/1965 | McCormick | 236—34 |

EDWARD J. MICHAEL, *Primary Examiner.*